United States Patent
Anumala (10) Patent No.: US 7,929,443 B1
(45) Date of Patent: Apr. 19, 2011

(54) SESSION BASED RESOURCE ALLOCATION IN A CORE OR EDGE NETWORKING DEVICE

(75) Inventor: Monish Anumala, Littleton, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1164 days.

(21) Appl. No.: 10/902,634

(22) Filed: Jul. 29, 2004

Related U.S. Application Data (60) Provisional application No. 60/549,509, filed on Mar. 2, 2004.

(51) Int. Cl.
G08C 15/00 (2006.01)
G06F 15/16 (2006.01)

(52) U.S. Cl. .................. 370/235; 709/228; 709/229

(58) Field of Classification Search .......... 370/235, 370/254, 229, 473, 394; 709/228, 221; 710/56
See application file for complete search history.

(56) References Cited

U.S. PATENT DOCUMENTS

| | | | | |
|---|---|---|---|---|
| 5,029,164 | A * | 7/1991 | Goldstein et al. | 370/235 |
| 6,182,149 | B1 * | 1/2001 | Nessett et al. | 709/247 |
| 6,247,058 | B1 * | 6/2001 | Miller et al. | 709/234 |
| 6,516,350 | B1 * | 2/2003 | Lumelsky et al. | 709/226 |
| 6,798,768 | B1 * | 9/2004 | Gallick et al. | 370/352 |
| 7,046,680 | B1 * | 5/2006 | McDysan et al. | 370/396 |
| 7,287,070 | B2 * | 10/2007 | Shaheen et al. | 709/223 |
| 7,447,211 | B1 * | 11/2008 | Scholte | 370/395.21 |
| 2002/0041590 | A1 * | 4/2002 | Donovan | 370/352 |
| 2002/0080789 | A1 * | 6/2002 | Henderson et al. | 370/392 |
| 2002/0101822 | A1 * | 8/2002 | Ayyagari et al. | 370/235 |
| 2002/0150041 | A1 * | 10/2002 | Reinshmidt et al. | 370/216 |
| 2004/0148391 | A1 * | 7/2004 | Lake et al. | 709/224 |
| 2004/0170156 | A1 * | 9/2004 | O'Neill | 370/349 |
| 2004/0196853 | A1 * | 10/2004 | Saito et al. | 370/395.21 |
| 2005/0015493 | A1 * | 1/2005 | Anschutz et al. | 709/226 |

OTHER PUBLICATIONS

R. Braden, "RFC: 2205 Resource ReSerVation Protocol (RSVP) Functional Specification," Sep. 1997, Network Working Group p. 5-63.*

* cited by examiner

*Primary Examiner* — Man Phan
*Assistant Examiner* — Ryan C Kavleski
(74) *Attorney, Agent, or Firm* — David A. Dagg (57) ABSTRACT

A system for providing session based resource allocation in a core or edge networking device are disclosed. Session awareness is provided in networking devices by session control signal interception and interpretation, followed by session based resource commitment, session data packet treatment, and session management within the networking devices. The session awareness provided to networking devices through the convergence software provides the networking devices with the ability to differentiate between packets belonging to different communication sessions, and to provide the services needed for each committed session.

11 Claims, 4 Drawing Sheets

SESSION BASED RESOURCE ALLOCATION IN A CORE OR EDGE NETWORKING DEVICE

CROSS REFERENCE TO RELATED APPLICATIONS

This application claims priority under 35 USC §119(e) to provisional application Ser. No. 60/549,509, entitled "GUARANTEED BANDWIDTH AND SECURITY IN CONVERGED NETWORKS", and filed Mar. 2, 2004.

FIELD OF THE INVENTION

The present invention relates generally to improving performance of voice and multi-media communication sessions in a converged, packet-based communication network, and more specifically to a system and method for session based resource allocation in a core or edge networking device.

BACKGROUND OF THE INVENTION

As it is generally known, high levels of data traffic traversing a networking device in a communication network may result in congestion. In existing systems, when congestion occurs, networking devices typically treat all voice and/or multi-media application communication sessions alike, because of they lack the ability to differentiate between individual sessions. This lack of session and/or call information at traffic aggregation points in a network may result in perceivable decreases in performance for voice and/or multi-media applications in the face of network congestion. Using current networking protocols and techniques, when sufficient data traffic aggregation occurs at one or more networking devices, packets will be dropped without regard to the specific sessions they belong to. As a result, reduced Quality of Service (QoS) caused by congestion conditions effects sessions of converged applications, such as voice and multi-media applications. Additionally, lack of knowledge of session information at networking devices at the edge of the communication network ("edge devices") may result in lack of security, due to vulnerability to certain types of attacks.

One potential solution to these problems is establishing guaranteed bandwidth tunnels between gateway networking devices. For example, using protocols such as RSVP-TE (ReSerVation Protocol with Traffic Engineering), and tunneling mechanisms such as MPLS (MultiProtocol Label Switching), IP GRE (Internet Protocol Generic Routing Encapsulation), VPN (Virtual Private Network), etc., guaranteed bandwidth tunnels can be created. However, this approach has significant drawbacks, including the following:

i) Available bandwidth in networking devices of the converged network cannot effectively be shared, since a full mesh topology is created between the gateway devices.

ii) Scaling and provisioning may be difficult when the number of gateways and session end points is large, because of the resulting full mesh topology. Adding or removing a gateway device may result in a need to re-provision all gateway devices in the network.

iii) Most enterprise networking devices cannot support complex end-to-end tunneling mechanisms.

iv) Soft clients, such as SIP (Session Initiation Protocol) phones on a personal computer, can't participate in tunnels.

These problems militate away from a solution based on guaranteed bandwidth tunnels. Similarly, if managing guaranteed bandwidth tunnels is an overly complex approach, managing session based tunnels would also be even more difficult, since sessions are between two or more application end points, possibly on different trusted or un-trusted software and hardware platforms, and may be dynamic, as when a voice call is established when needed, and torn down after use. Moreover, converged application components have no knowledge of the operational details of the network cloud that connects them.

Accordingly, for the above reasons and others, it would be desirable to provide granular network service at the session level, within networking devices of a converged data network. It would further be desirable to provide session specific information for use in edge networking devices, so that they can mitigate security problems by treating traffic not belonging to an established session using best effort techniques.

SUMMARY OF THE INVENTION

To address the above described and other shortcomings of existing systems, a system and method for providing session-based resource allocation in a core or edge networking device are disclosed. The disclosed system creates session awareness in networking devices by session control signal interception and interpretation. The session information awareness thus provided is then used to support session based resource commitment, session based data packet treatment, and session management within the networking devices. The session awareness provided to networking devices through the disclosed system provides networking devices with the ability to differentiate between packets belonging to different communication sessions, and to provide the services individually needed for each committed session.

By introducing session knowledge into networking devices, the disclosed system allows those networking devices to offer improved services to network users. The disclosed system goes beyond the basic connectivity services provided by previous networking systems, and helps enable better application convergence in a communication network. The disclosed system enables better support for the convergence of multi-media and voice application software with other software applications through potentially congested networking devices.

The disclosed system enables session-level granularity of service within networking devices of a converged data network, by providing session specific information for use in core and edge networking devices. The disclosed system can effectively mitigate security problems by treating traffic not belonging to an established session using best effort techniques. Advantageously, the disclosed system does not rely on, or require the use of guaranteed bandwidth tunnels.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

This application claims priority under 35 USC §119(e) to provisional application Ser. No. 60/549,509, entitled "GUARANTEED BANDWIDTH AND SECURITY IN CONVERGED NETWORKS", and filed Mar. 2, 2004, all disclosures of which are hereby included by reference herein.

Figure 1:
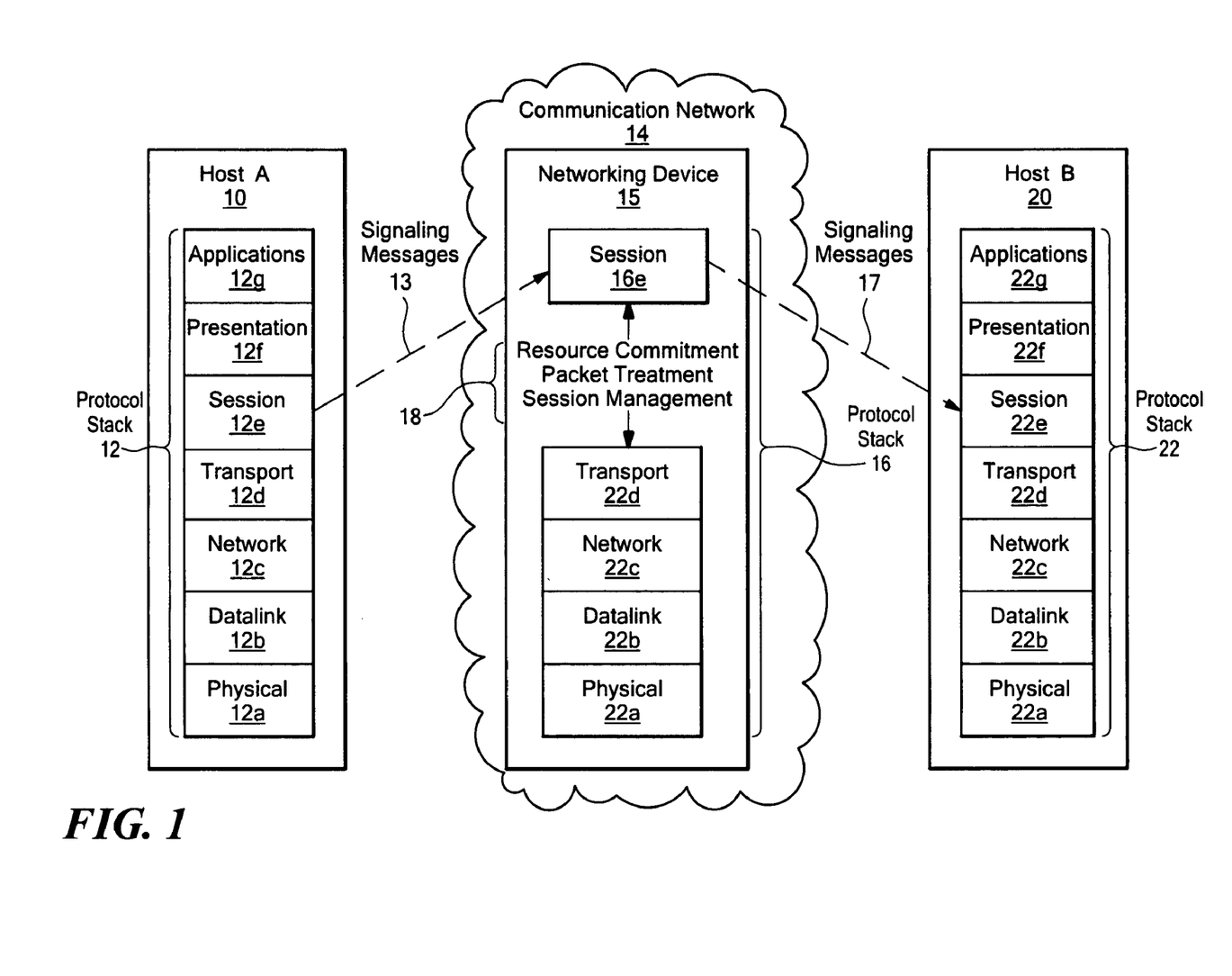
FIG. 1 is a block diagram showing components and operation of an illustrative embodiment of the disclosed system in a communication network.

As shown in FIG. 1, an illustrative embodiment of the disclosed system operates in an environment including a first host computer system Host A 10 having a protocol stack 12, where the Host A 10 is communicatively coupled to a communication network 14 having a number of communication devices including a networking device 15. A second host computer system Host B 20 is also shown communicatively coupled to the communication network 14, and includes a protocol stack 22. The protocol stack 12 in Host A 10 and the protocol stack 22 in Host B 20 are, for example, based on the ISO (International Standards Organization)/OSI (Open Systems Interconnection) model. Accordingly, the protocol stack 12 may include a physical layer 12a, datalink layer 12b, network layer 12c, transport layer 12d, session layer 12e, presentation layer 12f, and application layer 12g. Similarly, the protocol stack 22 ma include a physical layer 22a, datalink layer 22b, network layer 22c, transport layer 22d, session layer 22e, presentation layer 22f, and application layer 22g.

The session layer of each of the protocol stacks 12, 16 and 22 of FIG. 1 may operate to establish, manage and control one-way or two-way communication sessions between Host A 10 and Host B 20. Examples of session layer protocols include MGCP (Media Gateway Control Protocol), H.323 (an International Telecommunication Union standard for real-time voice and videoconferencing over packet networks), SIP (Session Initiation Protocol), and others. The transport layer of the protocol stacks 12, 16 and 22 may be responsible for overall end to end validity and integrity of transmissions between Host A 10 and Host B 20. The network layer or each of the protocol stacks 12, 16 and 22 establishes the route between Host A 10 and Host B 20, and the data link layer is responsible for node to node validity and integrity of transmission between adjacent nodes, while the physical layer is responsible for passing bits onto and receiving from the connecting medium between devices. Corresponding protocol layers within the devices shown in FIG. 1 read and process the respective protocol headers with them in packets passed between Host A 10 and Host B 20.

Some number of application programs or application client programs are network enabled on Host A 10 and Host B 20 through the software, firmware and/or hardware making up the respective protocol stacks 12 and 22. Such applications may establish one or more communication sessions between Host A 10 and Host B 20, and may include VoIP (Voice over Internet Protocol), multi-media, and other specific types of applications. The Host A 10 and Host B 20 may be embodied using any specific type of computer system including one or more processors, computer program memory and/or storage, input/output (I/O) devices, and operating system software. The networking device 15 may be embodied using any specific type of networking device, such as a switch, router, bridge, or other device operating to forward data through the communication network 14. The networking device 15 may represent either a core networking device within the communication network 14, or an edge networking device located at the edge of the communication network 14.

During operation of the devices shown in FIG. 1, signaling messages are 13 are sent from the Host A 10, to the networking device 15. Such signaling messages include those used to set up or tear down a voice call or multi-media session between the Host A 10 and the Host B 20. When the networking device 15 receives signaling messages 13, it intercepts them through the session layer 16e of the protocol stack 16. The protocol stack 16 is further shown including physical layer 16a, datalink layer 16b, network layer 16c, and transport layer 16d. The protocol stack 16 may be embodied using software, firmware, and/or hardware components.

In response to the intercepted signaling messages 13, operations 18, shown including resource commitment, packet treatment, and session management, are performed between the session layer 16e and the lower layers of the protocol stack. Signaling messages 17 are sent from the network device 15 on to Host B 20. Signaling messages 17 may forwarded copies of the signaling messages 13, or may be modified versions of the signaling messages 13, or may be generated within the networking device 14.

Figure 2:
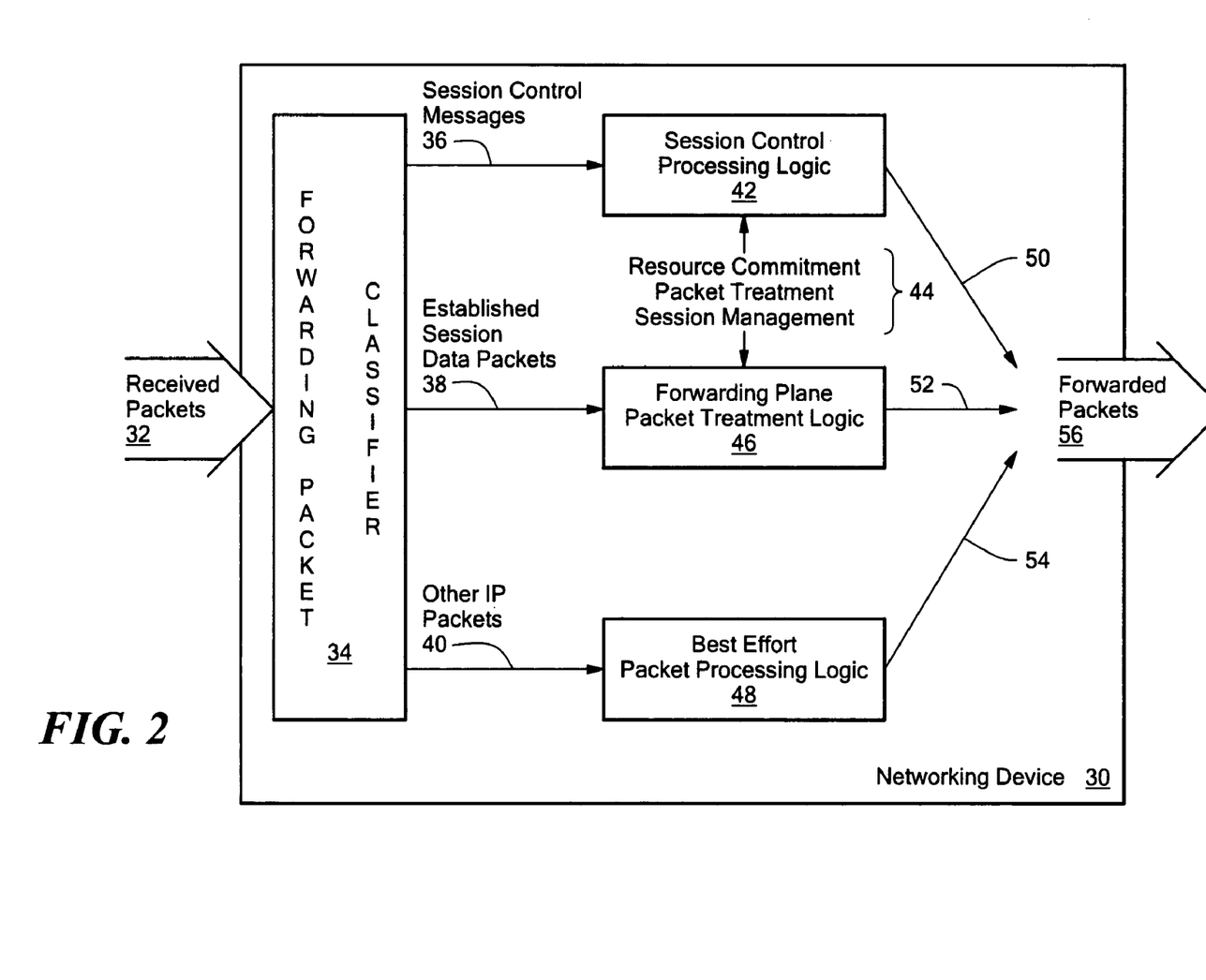
FIG. 2 is a block diagram showing components and operation of an illustrative embodiment of the disclosed system in a networking device.

FIG. 2 shows an embodiment of a networking device 30 in accordance with in illustrative embodiment of the disclosed system. As shown in FIG. 2, received packets 32 are processed in a forwarding packet classifier 34, which examines fields in the packet headers to determine how the received packets are to be forwarded within the networking device 30. The forwarding packet classifier 34 operates at least in part responsive to portions of the session layer headers of the received packets 32. For example, the forwarding packet classifier compares values at predetermined offsets within session layer headers of received packets 32 with one or more predetermined bit patterns or values indicating whether the individual received packets are: session control messages 36, packets 38 belonging to previously established sessions, or other packets 40. The session control messages 36 are forwarded to the session control processing logic 42, which also includes and maintains some number of per session data structures. The established session data packets 38 are forwarded to the forwarding plane packet treatment logic 46, and other packets 40 are processed using best effort packet forwarding logic 48. The forwarding packet classifier 34, session control processing logic 42, forwarding plane packet treatment logic 46 and best effort packet processing logic 48 may be embodied using any specific combination of software, firmware, and/or hardware that is appropriate for a specific networking device implementation.

During operation of the networking device 30, operations 44 are performed between the session control processing logic 42 and the forwarding plane packet treatment logic 48. The operations 44 include resource commitment and packet treatment responsive to intercepted session control messages 36, as well as session management responsive to events detected in the forwarding plane packet treatment logic. For example, packet forwarding resources, such as buffers or forwarding logic within the networking device may be reserved by the session control processing logic 42 in response to a session control message requesting that a session be established. Modified or generated session control messages 50, forwarded packets for established sessions 52, and other packets forwarded on a best effort basis are conveyed out of the networking device 30 as part of the forwarded data packets 56.

Figure 3:
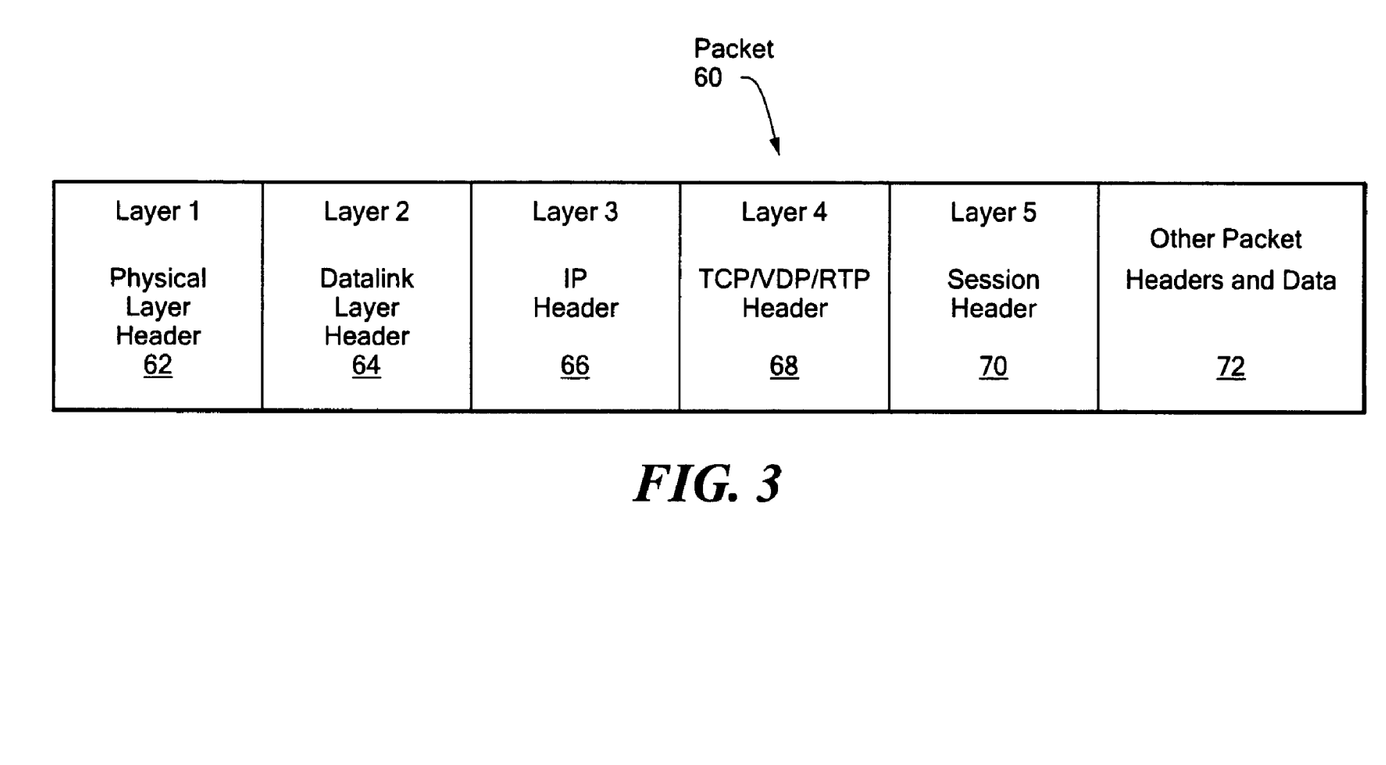
FIG. 3 shows a format of the fields in a data packet as processed in an illustrative of the disclosed system.

FIG. 3 shows an example of a format of the fields in a data packet as processed in an illustrative of the disclosed system. As shown in FIG. 3, a packet 60 received by the networking device of the disclosed system may include a layer 1 physical layer header 62, a layer 2 datalink header 64, a layer 3 IP header 66, a layer 4 TCP (Transport Control Protocol), UDP (User Datagram Protocol) or RTP (Real-time Transport Protocol) header 68, a layer 5 session header 70, and other packet headers and data 72. As it is generally known, the information contained in the layer 5 session header 70 are used to initiate and manage communication sessions of applications using the communication network. Accordingly, session control messages typically use the fields within the layer 5 session header 70 to store values indicating the type of messages and the associated actions. Similarly, data packets for previously established communication sessions indicate their associated session through values in the layer 5 session header 70. The disclosed system operates in part by intercepting session control messages, and associating other packets with previously established communication sessions, based matching predetermined values or patterns within fields contained in the layer 5 session header 70 of received packets.

Figure 4:
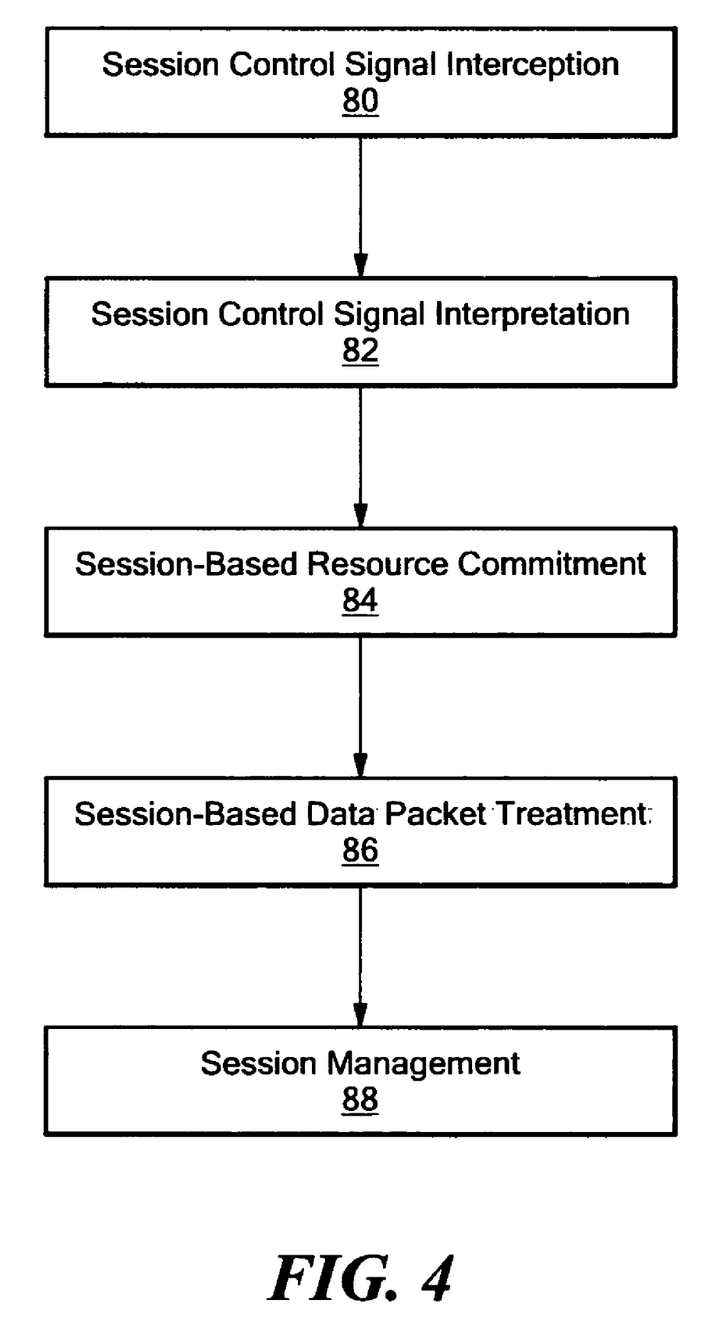
FIG. 4 is a flow chart showing steps performed during operation of an illustrative embodiment of the disclosed system.

FIG. 4 is a flow chart showing steps performed during operation of an illustrative embodiment of the disclosed system. As shown in FIG. 4, effective session awareness in a networking device may be achieved using the disclosed system by session control signal interception at step 80, session control signal interpretation at step 82, session-based resource commitment at step 84, session-based data packet treatment at step 86, and session management at step 88. Software and/or hardware or firmware logic to implement the steps shown in FIG. 4 may be provided within the forwarding packet classifier 34, session control processing logic and per-session data structures 42, and forwarding plane packet treatment logic of FIG. 2. For example, session control signal interception 80 and session data packet treatment 86 may be performed, at least in part, by the forwarding packet classifier 34 and forwarding plane packet treatment logic 46. Similarly, session control signal interpretation 82, session-based resource commitment 84, and session management 88 may be performed, at least in part, by the session control processing logic and per-session data structures 42 of FIG. 2. While in the following description a SIP based session is used for purposes of explanation, the description applies to any other type of session, such as those associated with MGCP, H.323, and others.

At step 80, the disclosed system detects packet that carries session control data. In the SIP example, session control packets that need to be intercepted are session setup, session modification, and session tear down packets. In the case where hardware based forwarding may prevent deep packet inspection, a packet filter can be set up in the hardware of the networking device to detect the appropriate session control packets. Such a filter can be as simple as one requiring that packets with a certain DiffServ value or IEEE priority value be forwarded to the session control processing logic 42 of FIG. 2, and a rate limiter may also be applied to such forwarded packets. The rate limiter can be calculated from how many session setups/tear downs the session control processing logic 42 can handle per second. Additionally, various load distribution algorithms may be used for session setup among distributed networking devices using the disclosed system. Moreover, some session related signaling packets may not need be intercepted at all. For example, in the SIP example, a SIP ack packet need not be intercepted.

After interception processing at step 80, the session control processing logic 42 receives the intercepted session control packets for processing at step 82, in which the session control data is interpreted for purposes of session setup or teardown. Also at step 82, the system resources that are required for a session setup are determined. For example, In the example of setting up a SIP session, the disclosed system may operate to determine that the requested session is for a voice application, and that accordingly 64 kb/s of constant throughput needs to be provided for that session.

At step 84, the disclosed system allocates system resources in the networking device for a session. The process of session commitment may be accomplished in two phases. A first phase partial commitment may be performed when the control signal is interpreted, and a determination made as to whether system resources are available to support the requested session. The session control packet may be modified at this point to reflect availability or lack of system resources for the session at the networking device, and then forwarded to the next networking device on the way to the destination. A second phase commitment may then be performed when a control signal from the direction of the destination device is received, indicating the that there are sufficient network resources are available for the session from end to end. This confirmation control signal may be sent by a gateway or application client or the edge router/switch connected to the end user. To support this stage of processing, existing signaling protocols may need to be extended to support the disclosed system. For example, networking devices may need to be able to mark session control packets traversing back to the originator of the session, or to send new control packet type in that direction, in order to indicate that a full commitment of resources has been made. Such extensions may be provided so that only networking devices need to support them, while applications are not required to be modified.

At the end of step 84, system resources have been committed to support the requested session, or not committed in the case where the session could not be supported. If the resources have been committed for the session, then a session entry is added to the session database or other data structure in association with the session control logic and per-session data structures 42 shown in FIG. 2. In the SIP example, an entry is added to a session table with appropriate destination IP address, source IP address, destination UDP port, source UDP port and UDP/RTP packet type. This session table can be implemented as a filter table in some constrained hardware forwarding application specific integrated circuits (ASICs). The allocated resources are based on the interpretation at step 82. For example, resources sufficient to support 64 kb/s of bandwidth between two ports of the network element may be allocated at step 84.

At step 86, session-based data packet treatment is performed. For example, when a packet enters a networking device at an ingress port with a predetermined DiffServ/IEEE priority, the packet is classified as voice data, or a particular type of data. The disclosed system operates to search for a session entry in a session table associated with the type of the received packet. If the session entry exists, then the disclosed system uses the system resources committed to the session to process the packet. If there is no existing entry for the session, then the packet is processed by sharing system resources available for that type of packet, along with any other packets of that type not associated with committed sessions.

In the SIP example, a networking device may, for example, be able to support ten thousand voice calls between two of its ports. If there are eight thousand on-going committed voice calls between those ports, an introduction of another eight thousand voice calls worth of malicious intruder traffic cannot degrade the voice quality of the legitimate and on-going voice calls. This is because the legitimate calls that are committed will use committed system resources in the networking device, and the intruder calls have to share the rest of the allocated bandwidth, if any.

Once a session is created, it needs to be managed at step 88. Session management may be performed based on simple statistics collection, or actively attempt to find the 'health' of an existing session. If a session died for some reason, and an explicit session tear-down message wasn't sent, then the session management software in the disclosed system may operate to detect this event and perform any appropriate clean-up activities. For example, one simple way to perform session cleaning is to find the activity of the session on both the ingress and egress ports of the networking device. If the session is inactive based on this checking, then it can be cleaned up. In one embodiment, session clean-up is always initiated by the edge networking device that is connected to a gateway or to the application client. When such an edge device detects sufficient inactivity, it sends an explicit tear-down message to the client on the other end of the session connection, and the message is marked indicating the edge networking device that initiated the tear-down. All core networking devices remove the session from their internal configurations, and the edge device connected to the other end user consumes the tear-down control packet, such that it is not transmitted to the end user system on the other end of the session connection. Such functionality may require modification of existing signaling protocols in some implementations.

Alternatively, the health of an existing session may be determined by implementing a signaling protocol based ping. This technique will indicate if a session is still alive or not. If a signaling protocol doesn't support such a feature, it may be preferable to go with the inactivity detecting approach, since that approach does not require changes to the application clients, or gateways. A periodic ping technique can be implemented from one edge networking device to the other edge networking device to find any changes in the network. If the network changed to adjust a networking device state change, then using the edge devices can find the change and cause the session tear-down.

The disclosed system provides a way for a networking device to feed back session layer information into lower level resource allocation, resulting in resource allocation on a per-session basis. The disclosed system is generally advantageous in that in a converged network there would be less likelihood of voice or multi-media quality degradation.

FIGS. 1-2 and 4 are flowchart and block diagram illustrations of methods and apparatus (systems) that may be embodied using software and/or hardware logic components. It will be understood that each block of the illustrations, and combinations of blocks in the illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the illustrative block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks within each figure. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks of the figures. Alternatively, the functions necessary to implement the invention may alternatively be embodied in part or in whole using hardware logic components such as Application Specific Integrated Circuits or any other specific types of hardware circuits, or some combination of hardware components and software. Accordingly, the blocks in the block diagrams and flowchart may be implemented in whole or in part using such hardware logic.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

I claim:

1. A method for providing improved performance in a networking device, comprising:

intercepting a first session control message at said networking device, said first session control message sent from a session originator to a session destination, wherein said networking device is located between said session originator and said session destination;

interpreting said first session control message at said networking device;

allocating at least one resource in said networking device for use in processing received data packets associated with a communication session, wherein said allocating includes a first phase performed in response to said intercepting said first session control message and said interpreting said first session control message, in which a determination is made that said at least one resource in said networking device is available to support said communication session and said first session control message is modified to reflect availability of said at least one resource at said networking device and said modified first session control message is forwarded to a next networking device on the way to said session destination, and a second phase in which a second session control message is received from said next networking device, said second session control message indicating that there are sufficient end to end network resources between said session originator and said session destination available for and committed to said communication session, said second session control message traversing back to said session originator from said session destination;

monitoring activity of said communication session at ingress and egress ports of said networking device; and responsive to detecting sufficient inactivity of said communication session at said ingress and egress ports of said networking device, cleaning up said communication session by sending a tear-down message from said networking device to a host computer system comprising one of the set consisting of said session originator and said session destination, said tear-down message causing all other networking devices located between said networking device and said host computer system to remove said communication session from their internal configurations, and wherein said tear-down message is consumed by an edge networking device connected to said host computer system to prevent transmission of said tear-down message to said host computer system.

2. The method of claim 1, wherein said intercepting further comprises matching a predetermined bit pattern with the contents of a session layer header in said at least one session control message.

3. The method of claim 1, further comprising:
receiving at least one packet associated with said communications session and processing said at least one packet using said at least one resource in said networking device.

4. The method of claim 1, further comprising receiving at least one packet not associated with said communications session and processing said at least one packet on a best effort basis.

5. The method of claim 1, further comprising:
distinguishing between a plurality of communication sessions associated with a plurality of received data packets; and processing each of said plurality of received data packets in accordance with networking device resources allocated to corresponding ones of said plurality of communication sessions.

6. A networking device including at least one processor and at least one computer readable storage medium having program code for execution on said processor stored thereon, said program code comprising:
session control message intercepting logic for intercepting a first session control message at said networking device, said first session control message sent from a session originator to a session destination, wherein said networking device is located between said session originator and said session destination;

session control message interpreting logic for interpreting said first session control message at said networking device;

session specific resource allocation logic for allocating at least one resource in said networking device for use in processing received data packets associated with a communication session, wherein said session specific resource allocation logic operates in a first phase in response to said intercepting said first session control message and said interpreting said first session control message to determine whether said at least one resource in said networking device is available to support said communication session and said first session control message is modified to reflect availability of said at least one resource at said networking device and said modified first session control message is forwarded to a next networking device on the way to said session destination, and in a second phase to receive a second session control message from said next networking device, said second session control message indicating that there are sufficient end to end network resources between said session originator and said session destination available for said communication session, said second session control message traversing back to said session originator from said session destination; and session specific resource deallocation logic for monitoring activity of said communication session at ingress and egress ports of said networking device, and, responsive to detecting sufficient inactivity of said communication session at said ingress and egress ports of said networking device, cleaning up said communication session by sending a tear-down message from said networking device to a host computer system comprising one of the set consisting of said session originator and said session destination, said tear-down message causing all other networking devices located between said networking device and said host computer system to remove said communication session from their internal configurations, and wherein said tear-down message is consumed by an edge networking device connected to said host computer system to prevent transmission of said tear-down message to said host computer system.

7. The networking device of claim 6, wherein said session control message interpreting logic further comprises pattern matching logic for matching a predetermined bit pattern with the contents of a session layer header in said at least one session control message.

8. The networking device of claim 6, further comprising:
packet forwarding logic for receiving at least one packet associated with said communications session and processing said at least one packet using said at least one resource in said networking device.

9. The networking device of claim 6, further comprising best-effort packet forwarding logic for receiving at least one packet not associated with said communications session and processing said at least one packet on a best effort basis.

10. The networking device of claim 6, further comprising:
received packet session distinguishing logic for distinguishing between a plurality of communication sessions associated with a plurality of received data packets; and
packet forwarding logic for processing each of said plurality of received data packets in accordance with networking device resources allocated to corresponding ones of said plurality of communication sessions.

11. A networking device including at least one processor and at least one computer readable storage medium having program code for execution on said processor stored thereon, said program code comprising:
means for intercepting a first session control message at said networking device, said first session control message sent from a session originator to a session destination, wherein said networking device is located between said session originator and said session destination;

means for interpreting said first session control message at said networking device;

means for allocating at least one resource in said networking device for use in processing received data packets associated with a communication session, wherein said allocating includes a first phase performed in response to said intercepting said first session control message and said interpreting said first session control message, in which a determination is made that said at least one resource in said networking device is available to support said communication session and said first session control message is modified to reflect availability of said at least one resource at said networking device and said modified first session control message is forwarded to a next networking device on the way to said session destination, and a second phase in which a second session control message is received from said next networking device, said second session control message indicating that there are sufficient end to end network resources between said session originator and said session destination available for said communication session, said second session control message traversing back to said session originator from said session destination; and means for monitoring activity of said communication session at ingress and egress ports of said networking device, and, responsive to detecting sufficient inactivity of said communication session at said ingress and egress ports of said networking device, for cleaning up said communication session by sending a tear-down message from said networking device to a host computer system comprising one of the set consisting of said session originator and said session destination, said tear-down message causing all other networking devices located between said networking device and said host computer system to remove said communication session from their internal configurations, and wherein said tear-down message is consumed by an edge networking device connected to said host computer system to prevent transmission of said tear-down message to said host computer system.

* * * * *